(12) United States Patent
Jain et al.

(10) Patent No.: US 9,621,771 B2
(45) Date of Patent: Apr. 11, 2017

(54) SYSTEM AND METHOD FOR IMAGING UTILITY PANEL ELEMENTS

(71) Applicant: Pelco, Inc., Clovis, CA (US)

(72) Inventors: Prateek Jain, Clovis, CA (US); Greg M. Millar, Clovis, CA (US); David Dorn, Clovis, CA (US); Susan Brooks-Evans, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 575 days.

(21) Appl. No.: 13/828,572

(22) Filed: Mar. 14, 2013

(65) Prior Publication Data

US 2014/0267708 A1  Sep. 18, 2014

(51) Int. Cl.
*H04N 5/00* (2011.01)
*H04N 5/225* (2006.01)
*H04N 5/232* (2006.01)
*H04N 5/33* (2006.01)
*H04N 7/18* (2006.01)

(52) U.S. Cl.
CPC ....... *H04N 5/2254* (2013.01); *H04N 5/23206* (2013.01); *H04N 5/33* (2013.01); *H04N 7/183* (2013.01)

(58) Field of Classification Search
CPC .. H04N 5/33; H04N 5/332; H04N 3/09; G01J 5/02; G01J 2005/0077; G01R 31/08
See application file for complete search history.

(56) References Cited

U.S. PATENT DOCUMENTS 5,181,108 A * 1/1993 Greene ........................... 348/61
5,500,737 A * 3/1996 Donaldson et al. .......... 356/606
5,548,394 A * 8/1996 Giles et al. ..................... 356/71
5,585,839 A * 12/1996 Ishida et al. ............... 348/14.09
6,282,021 B1 * 8/2001 Yano ............................. 359/415

(Continued)

FOREIGN PATENT DOCUMENTS

CN         201993435 U   *   9/2011

OTHER PUBLICATIONS

Machine translation of CN 201993435 U.*

(Continued)

*Primary Examiner* — Frank Huang
(74) *Attorney, Agent, or Firm* — Hamilton, Brook, Smith & Reynolds, P.C.

(57) ABSTRACT

Switch boxes and other such utility boxes must some time be monitored by video. And most of the time, they are behind a door for security and safety reasons In order to image them, the imaging system must then be located very close to them, that is, inside the enclosure. Disclosed herein are systems and corresponding methods for imaging and monitoring utility panel elements arranged on a utility surface. Example embodiments include an optical focusing element to focus rays from utility panel elements and image the elements onto an imaging plane that is non-parallel with a utility surface, and an imaging surface configured to acquire a representation of the image. Example systems and corresponding methods provide for thermal imaging of utility panel elements at close proximity to the elements and within an enclosure. An advantage of these systems and methods is that utility panel elements such as fuses and switches may be imaged even when located within an enclosure and remotely monitored.

23 Claims, 6 Drawing Sheets

(56) References Cited

U.S. PATENT DOCUMENTS

| | | | | |
|---|---|---|---|---|
| 7,064,789 | B1* | 6/2006 | Shono | 348/351 |
| 2002/0021287 | A1* | 2/2002 | Tomasi et al. | 345/168 |
| 2003/0164753 | A1* | 9/2003 | Gongolas | 340/286.06 |
| 2004/0012775 | A1* | 1/2004 | Kinney et al. | 356/237.2 |
| 2004/0145816 | A1* | 7/2004 | Engel | 359/656 |
| 2004/0263646 | A1* | 12/2004 | Cutler | 348/239 |
| 2006/0212168 | A1* | 9/2006 | Baba et al. | 700/245 |
| 2007/0120695 | A1* | 5/2007 | Albarado et al. | 340/679 |
| 2009/0051756 | A1* | 2/2009 | Trachtenberg et al. | 348/14.08 |
| 2011/0119987 | A1* | 5/2011 | Alter et al. | 43/61 |
| 2012/0162605 | A1* | 6/2012 | Koest | 351/221 |
| 2012/0274758 | A1* | 11/2012 | Lessard | 348/92 |

OTHER PUBLICATIONS

"Scheimpflug Principle," retrieved from http://en.wikipedia.org/wiki/Scheimpflug_principle, Jun. 20, 2013, 10 pages.

* cited by examiner

SYSTEM AND METHOD FOR IMAGING UTILITY PANEL ELEMENTS

BACKGROUND OF THE INVENTION

Utility panels may contain arrays of utility panel elements, such as switches or fuses. Such utility panels may be located within enclosures for safety and/or security purposes.

SUMMARY OF THE INVENTION

Monitoring utility panel elements with an imaging device may be difficult when the imaging device is within close proximity of the panel. Such a close proximity situation may occur, for example, when the imaging device operates within an enclosure housing the utility panel. Embodiments of the current invention permit imaging devices to acquire images of utility panel elements at close proximity to the panels. Images may be acquired even within an enclosure, and the images may be monitored or analyzed remotely.

In one embodiment, a system, or corresponding method, for imaging utility panel elements arranged on a utility surface includes an optical focusing element configured to focus rays from the utility panel elements and to form an image of the utility panel elements at an imaging plane, where the imaging plane is non-parallel with the utility surface. The system also includes an imaging surface situated at the imaging plane and configured to acquire a representation of the image.

In some embodiments, the utility surface, optical focusing element, and imaging surface are enclosed within an enclosure. In some embodiments having an enclosure, the enclosure includes a door. Some embodiments include a reflector configured to redirect rays from the utility surface toward the optical focusing element. Further, in some embodiments including an enclosure with a door, a reflector may be mounted on the door. In some embodiments, the utility surface, optical focusing element, and imaging surface are oriented in accordance with a Scheimpflug condition.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

As used in this application, "imaging" and "image" imply that optical conditions are met to render an image substantially in focus. Thus, for example, if an "image" of a subject surface is produced at an imaging surface, this implies that substantially all of the image of the subject surface is in focus at the imaging surface.

Electrical elements, such as switches, fuses, and circuit breakers, are susceptible to failure. Electrical elements may be arranged on surfaces of utility panels, and such utility panels may be enclosed within various structures of enclosures for purposes of safety and/or security. Failure of electrical elements results in a corresponding loss of a utility, such as electrical service or air conditioning service, for an end user or for users downstream of the failure of the electrical elements. One potential early indication that electrical components may fail is elevated temperature or overheating of the components. To monitor for overheating, cameras, particularly infrared cameras, may be used to image electrical elements in an embodiment of the invention. Thus, infrared cameras may be used to provide early warning of upcoming component failures. In another scenario, the utility panel elements may have a typical thermal profile due to conduction of current caused by a standard load. In an event the load unexpectedly discontinues due to a fault or theft, for example, the thermal profile at the utility element will change due to a drop in current flow. The infrared cameras and corresponding processors(s) can identify the change.

Electrical utility panels may be contained within enclosures for safety and/or security purposes, and any monitoring of enclosed panels must often be done outside of the enclosures or otherwise be done remotely. Further, the enclosures may be sufficiently small that imaging an entire panel with a single, stationary imaging device is difficult due to the close proximity of the imaging device to the utility panel surface. A typical way to produce an in-focus image of a subject surface is to place a lens between the subject surface and an imaging surface, with the subject surface, the lens, and the imaging surface all parallel to each other. However, at close proximity to a sufficiently large utility panel, this parallel configuration may be difficult or impossible to achieve.

Embodiments of the present invention provide a system and a corresponding method for imaging utility panel elements arranged on a utility surface. The imaging may be done at close proximity to the utility surface and may be done within a structure that encloses the utility surface. Embodiments of the invention may utilize an ability of an optical focusing element, such as a lens, to focus rays from a utility surface, to form an image of the utility surface or of utility panel elements arranged on a surface of the panel. An imaging surface, where the image of the utility surface is in focus, may be oriented within an imaging plane that is non-parallel with the utility surface. Utility panel elements may include switches, fuses, circuit breakers, or electrical interconnections. The utility panel may be a junction box panel or other type of electrical panel or other surface that has attached components that can overheat.

Embodiments of the invention may include a reflecting surface, such as a mirror as part of the imaging system. Further, in the case of an enclosure enclosing the utility surface and the imaging device, the imaging system may benefit from incorporating a part of the enclosure, such as a door or wall, as a mounting surface for the reflector. Images may be remotely monitored outside of a safety structure containing the utility panel.

In embodiments of the invention, a utility surface, an optical focusing element, and an imaging surface may be arranged according to a Scheimpflug condition such that an image of the utility surface is formed at the imaging surface even when the imaging surface is non-parallel with the utility surface.

Figure 1:
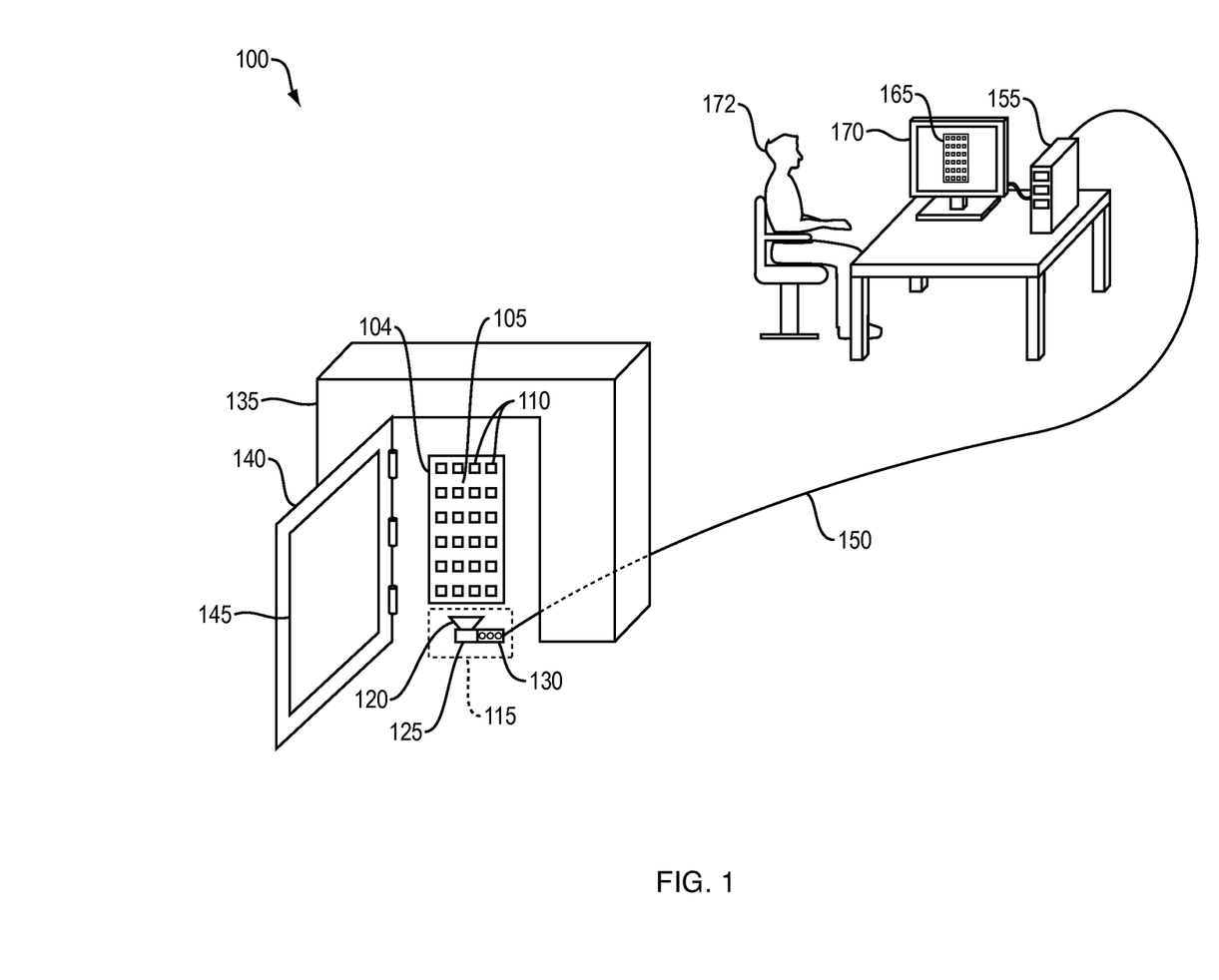
FIG. 1 is a diagram that illustrates a system according to an embodiment of the invention for external monitoring of utility panel elements arranged on a utility surface within an enclosure.

FIG. 1 is an illustration of a system 100 for monitoring utility panel elements 110 arranged on a utility surface 105. The utility surface 105 is part of a utility panel 104. The system 100 includes an imaging device 115. The imaging device 115 includes a lens 120, imaging surface 125, and communications interface 130. The imaging surface 125 is oriented within an imaging plane (not shown). The imaging surface 125 is non-parallel with the utility surface 105. The utility panel 104 and the imaging device 115 are housed within an enclosure 135.

The enclosure 135 includes an enclosure door 140. A mirror 145 is mounted on the enclosure door 140. The mirror 145 reflects or redirects rays from utility elements 110 toward the lens 120. The lens 120 focuses the rays from the utility panel elements 110 to form an image of the utility panel elements 110 at the imaging surface 125. The imaging surface 125 is configured to acquire a representation of the image of the utility panel elements 110. The system 100 in FIG. 1 is an overall illustration of a monitoring system and is not meant to show detailed geometry of rays or optical components. Optical geometry for embodiments is illustrated in greater detail in FIGS. 2-5.

Still referring to FIG. 1, the communications interface 130 communicates information associated with the representation of the image of the utility panel elements 110 via a cable 152 to a computer 155. In the system 100, the communications interface 130 is an electrical communications interface, and the cable 150 is an electrical cable. However, in other embodiments, a communications interface may be optical, wireless, or use X10 communications techniques. In the case of a wireless communications interface, a cable is not necessary. In the case of an optical communications interface, a fiber optic cable or free space link may be used.

In the system 100, the computer 155 functions as a receiver to receive the electrical signals representing the image of the utility panel elements 110 via the cable 150. The computer 155 produces an image 165 of the utility panel elements 110 on a computer monitor 170. A person 172 may view the image 165 of the utility panel elements 110 remotely, or at any location outside of the enclosure 135. However, in other embodiments, monitoring is done by other means, such as a direct input to a video monitor. Further, other embodiments utilize machine-based analysis of images rather than human monitoring. In some embodiments, a receiver includes a screen, recorder, additional communications interface, memory device or buffer.

The mirror 145 is configured to reflect rays from the utility panel elements 110 toward the lens 120 when the door 140 is closed. In other embodiments, a mirror or reflector may not be required. However, in some embodiments, an enclosure is large enough for an imaging device to acquire an image of utility panel elements without the use of a mirror. Further, some embodiments such as those shown in FIGS. 2-3 need not include mirrors or other types of reflectors.

In the system 100, the imaging device 115 is configured to image infrared light rays (not shown), but in other embodiments, the rays may be other types of rays, such as visible rays. In the system 100, the utility surface 105, focusing element 120, imaging surface 125, and communications interface 130 are encompassed by the enclosure 135. In other embodiments, the utility surface, focusing element, imaging surface, and communications interface are not enclosed within an enclosure or a subset of these elements is enclosed. In some embodiments, such as those shown in FIGS. 1 and 5, there is a reflector optically disposed between the utility surface and the optical focusing element, wherein the reflector is configured to redirect rays from the utility surface toward the optical focusing element, wherein the reflector is not attached to a door of an enclosure. In other embodiments, a mirror or other reflector is mounted in conjunction with a wall or other surface in an enclosure. Further, it will be appreciated that embodiments, such as that in FIG. 5, may include a reflector without any enclosure of the utility panel.

In some embodiments, a focusing element may be situated in a focusing element plane, and the utility surface, the focusing element plane, and the imaging surface may be oriented in accordance with a Scheimpflug condition, explained below in reference to FIG. 3. In some embodiments, the optical focusing element is a germanium lens. In some embodiments, the utility surface is a switch panel, fuse panel, circuit breaker panel, junction box panel, electrical panel, or electrical interconnect surface. In the system 100, the utility surface 105 is substantially planar. However, in other embodiments, the utility surface is not planar. Further, in some embodiments, the optical focusing element includes two or more elements configured to focus the rays to form the image.

Figure 2:
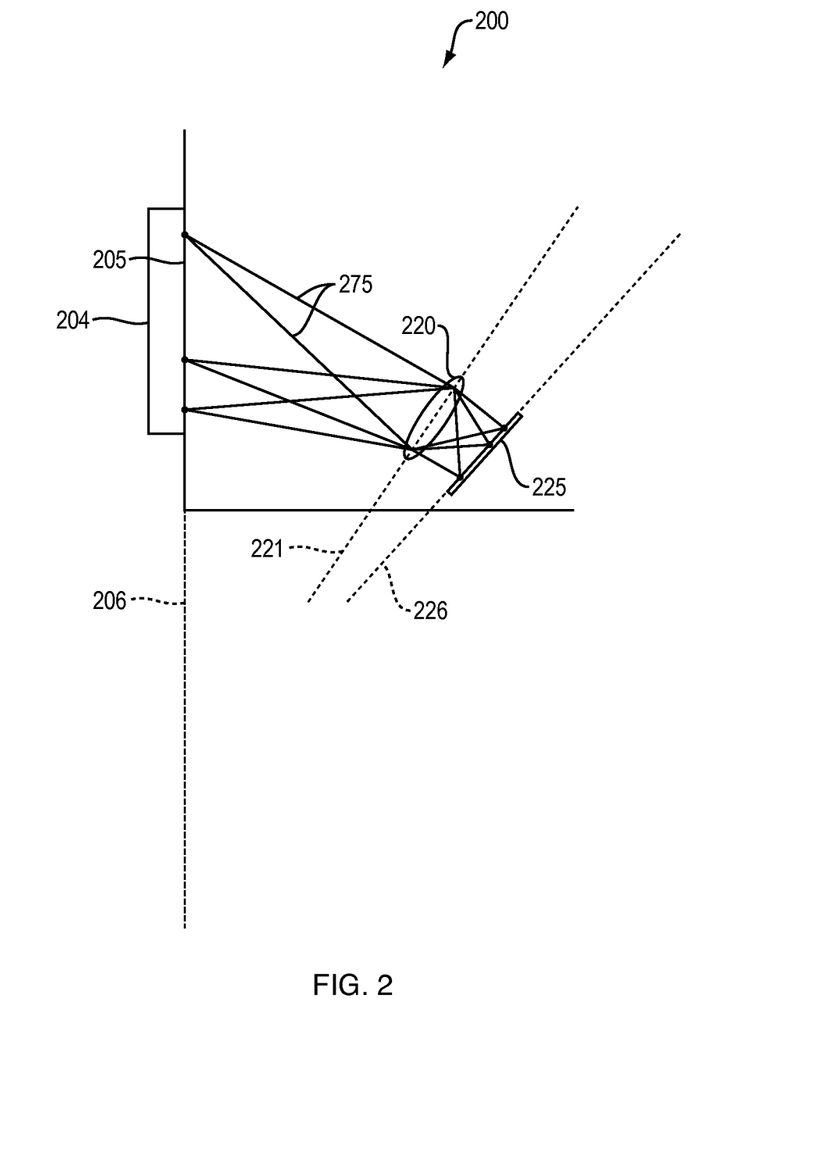
FIG. 2 is a schematic diagram of a system for imaging a utility surface onto an imaging surface that is non-parallel with the utility surface.

FIG. 2 is a schematic diagram of a system 200 for imaging utility panel elements (not shown) arranged on a utility surface 205. In the system 200, the utility surface 205 is part of a utility panel 204. The utility surface 205 is oriented in a utility surface plane 206. A lens 220 focuses rays 275 from utility panel elements (not shown) arranged on the utility surface 205 onto an imaging surface 225 to form an image of the utility surface 205. The lens 220 is oriented in a lens plane 221. The imaging surface 225 is arranged in an imaging plane 226, which is non-parallel with the utility surface 205.

The utility panel elements (not shown) are essentially in the same plane as the utility surface 205. Thus, when the optical components are arranged to render an image (in focus) of the utility surface 205, an image of the utility panel elements may also be rendered. Therefore, under the assumption that utility panel elements are essentially flush (or in the same plane) as the utility surface, imaging the utility surface and imaging the utility panel elements are essentially equivalent for focusing purposes.

Figure 3:
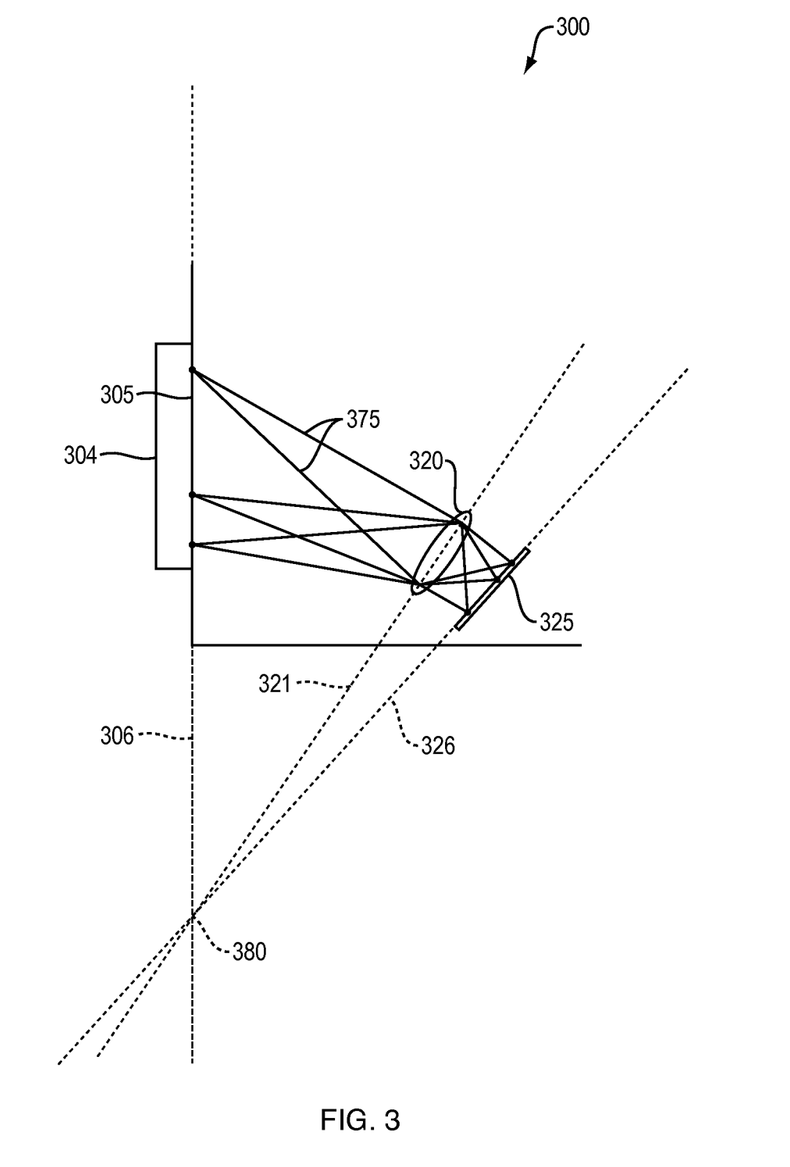
FIG. 3 is a schematic diagram of a system for imaging a utility surface in accordance with a Scheimpflug condition.

FIG. 3 is a schematic diagram of a system 300 for imaging utility panel elements (not shown) arranged on a utility surface 305, which is part of a utility panel 304. The system 300 is similar to system 200 in FIG. 2. However, a difference is that in the system 300, the utility surface 305, lens 320, and imaging surface 325 are arranged according to a Scheimpflug condition.

The Scheimpflug condition is a principle of geometric optics that may apply when the plane in which a lens is oriented and the plane in which an imaging surface is oriented are not parallel to each other. Viewed in another way, the principle may apply when the surface to be imaged (subject surface) is not parallel with the imaging surface. When the subject surface, the lens, and the imaging surface are oriented according to the Scheimpflug principle, an image of the subject surface may be rendered in focus at the imaging surface, even when the imaging surface is not parallel with the subject surface. According to the Scheimpflug principle, the plane in which the imaging surface is oriented and the plane in which the lens is oriented meet at an intersection point through which the plane of focus also passes.

As previously mentioned, the components in the system 300 are oriented to meet the Scheimpflug condition. Thus, the utility surface 305 is oriented in a utility surface plane 306, the lens 320 is oriented in a lens plane 321, and the imaging surface 325 is oriented within an imaging plane 326. The imaging plane 326 and lens plane 321 meet at an intersection point 380 through which the utility surface plane 306 also passes. An image of the utility surface 305 is rendered in focus at the imaging surface 325. Rays 375 from the utility panel elements (not shown) arranged on the utility surface 305 are focused by the lens 320 onto the imaging surface 325. The lens 320 is tilted with respect to the image plane. In embodiments in which a lens is also shifted parallel with the imaging plane, the configuration may be referred to as a "tilt-shift" configuration.

Figure 4:
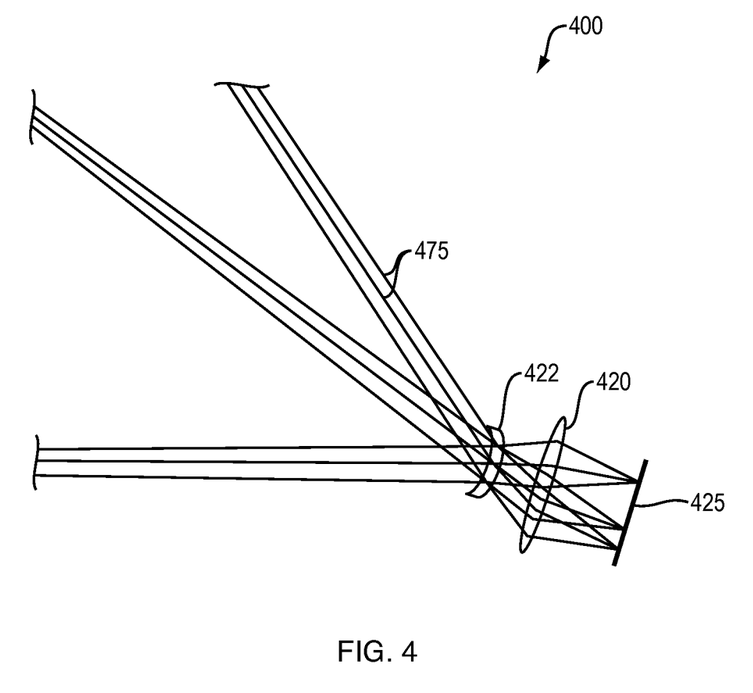
FIG. 4 is a schematic diagram of an imaging device including two optical focusing elements and an imaging surface according to an embodiment of the invention.

FIG. 4 is a schematic diagram of a portion of a system 400 for imaging utility panel elements (not shown) arranged on a utility surface (not shown). The system 400 illustrates that more than one optical focusing element may be used. Viewed in another way, an optical focusing element may include two or more optical elements. Accordingly, the system 400 uses lens 420 and lens 422 to focus rays 475 from utility panel elements (not shown) onto an imaging surface 425.

Figure 5:
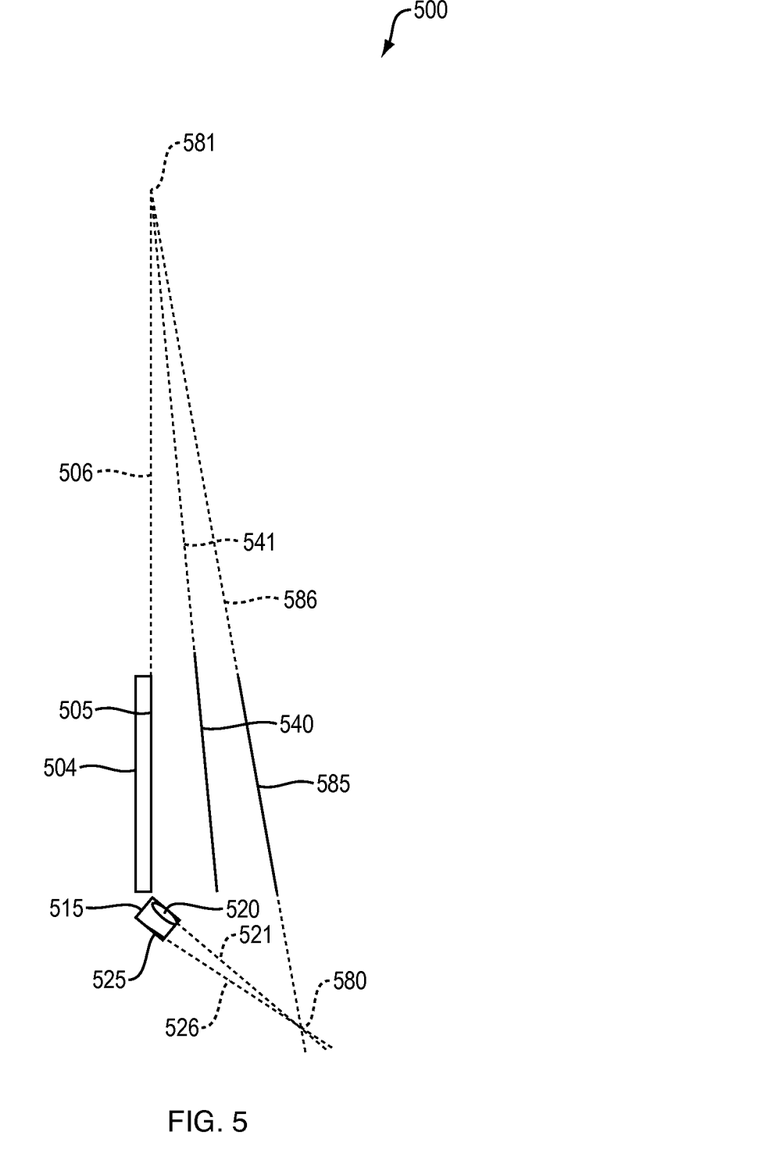
FIG. 5 is a schematic diagram of an embodiment of a system for imaging a utility surface, including a reflector.

FIG. 5 is a schematic diagram of a system 500 for imaging utility panel elements (not shown) arranged on a utility surface 505. The system 500 includes a mirror 540 as part of an imaging system. Utility panel elements (not shown) are arranged on a utility surface 505, which is part of a utility panel 504. The mirror 540 reflects rays (not shown) from utility surface 505 toward an imaging device 515. The imaging device 515 includes a lens 520 and an imaging surface 525.

In the system 500, the utility surface 505, mirror 540, lens 520, and imaging surface 525 are arranged to meet the Scheimpflug condition. In this case, the lens 520 is arranged in a lens plane 521, and the imaging surface 525 is arranged in an imaging plane 526. The lens plane 521 and the imaging plane 526 meet at intersection point 580. The utility surface 505 is arranged in a utility surface plane 506, and the mirror 540 is arranged in a mirror plane 541. The utility surface plane 506 and the mirror plane 541 meet at a second intersection point 581. A virtual imaging surface 585 is arranged in a virtual imaging plane 586, and the virtual imaging plane 586 joins intersection point 580 and second intersection point 581. The virtual imaging surface 585 is the surface that appears to be imaged due to the inclusion of the mirror 540. Thus, the Scheimpflug condition may also be met when a system includes a mirror or other reflector. Thus, an image of the utility panel elements (not shown) arranged on the utility surface 505 is rendered at the imaging surface 525.

Figure 6:
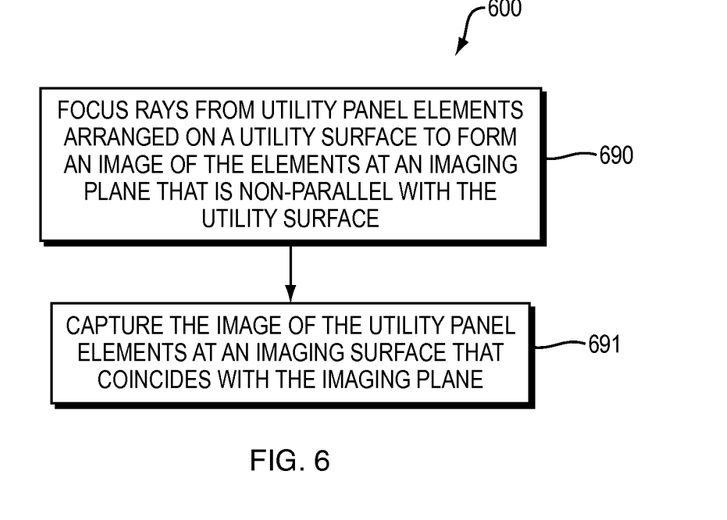
FIG. 6 is a flow diagram that illustrates a procedure for imaging utility panel elements arranged on a utility surface.

FIG. 6 is a flow diagram that illustrates a procedure 600 for imaging utility panel elements arranged on a utility surface. At 690, rays from utility panel elements arranged on a utility surface are focused to form an image of the elements at an imaging plane that is non-parallel with the utility surface. At 691, the image of the utility panel elements is captured at an imaging surface that coincides with the imaging plane.

In some embodiments, focusing light rays includes focusing infrared light rays. In some embodiments, the rays are focused and the image is captured within an enclosure, and the procedure also includes transmitting information from within the enclosure to outside of the enclosure, where the transmitted information is related to a status of the utilities and is based upon the image of the utility panel elements. In some embodiments, transmitting the information is done electronically or electrically. In other embodiments, transmitting the information is done optically or wirelessly.

Some embodiments may further include reflecting the rays from the utility panel elements and redirecting the rays to be focused. Further, in embodiments in which the ray focusing and the image capturing are performed within an enclosure, rays from the utility panel elements may be redirected and reflected at a reflecting surface that is situated in conjunction with a door to the enclosure. In some embodiments, the ray focusing and the image capturing are performed in accordance with a Scheimpflug condition. In some embodiments, focusing rays from the utility panel elements includes focusing rays from a switch panel, fuse panel, circuit breaker panel, junction box panel, electrical panel, or electrical interconnect.

Further embodiments according to the present invention include embodiments using panoramic imagers with wide field of view. Some imagers within the scope of the invention are catadioptric imagers that include a mirror and lens combination, with the mirror cross section having the shape of a conic section.

Figure 7:
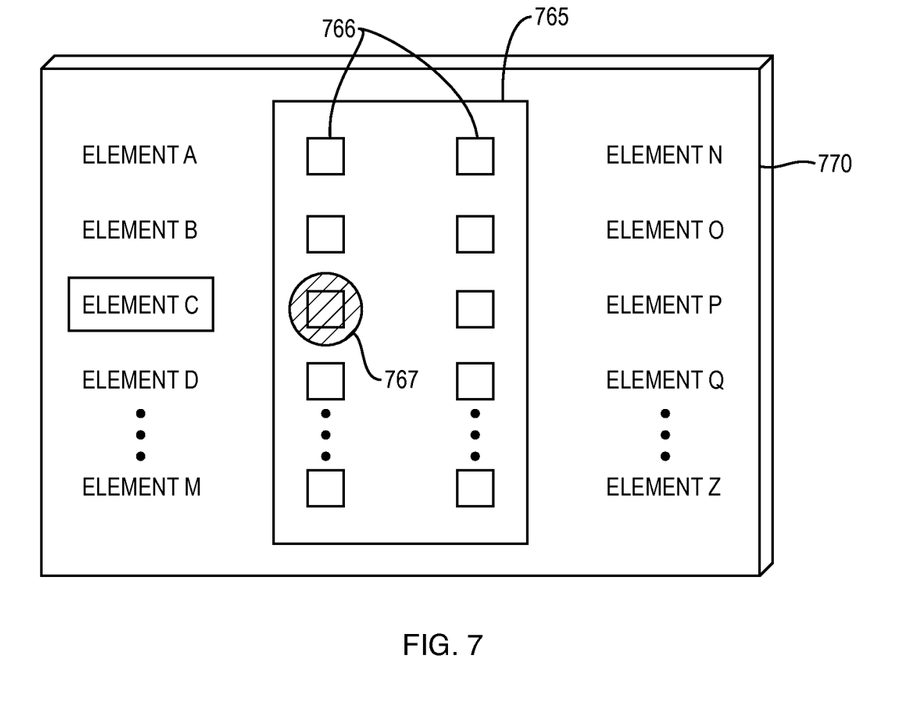
FIG. 7 is a diagram that illustrates a display showing an image of utility panel elements with status indication.

FIG. 7 is a diagram illustrating a display 770 showing an image 765 of utility panel elements 766 with a status indicator overlay 767. The display 770 is one example of a monitoring system that includes some machine-based analysis, as described above in conjunction with FIG. 1. In FIG. 1, the image 765 of the utility panel elements 766 is provided by an imaging device (not shown) such as imaging device 115 in FIG. 1. The status indicator overlay 767 is generated by a computer (not shown) such as the computer 155 in FIG. 1. The computer performs analysis of image information received from the imaging device to determine a status of the utility elements. For example, the computer may determine the brightness of the images of the individual utility panel elements 766 to calculate a temperature of each element.

Still referring to FIG. 7, the status indicator overlay 767 indicates a temperature status of the selected utility panel element. The status indicator overlay 767 may be colored green (not shown), for example, when the calculated temperature of the selected element is within an acceptable range. If the calculated temperature exceeds a predetermined threshold, the color status indicator overlay 767 may change to red, for example. It will be understood that variations of the status indicator overlay 767 may be in different positions on the display 770 and change in color, shape, design, or other characteristics to indicate status of utility elements. Further, other variations of the display 770 include a separate status indicator overlay such as the status indicator overlay 767 for each utility panel element.

While this invention has been particularly shown and described with references to example embodiments thereof, it will be understood by those skilled in the art that various changes in form and details may be made therein without departing from the scope of the invention encompassed by the appended claims.

What is claimed is:

1. A system for imaging utility panel elements arranged on a utility surface encompassed within an enclosure having a door, the system comprising:
    an optical focusing element configured to be positioned within the enclosure, to focus rays from the utility panel elements, and to form an image of the utility panel elements at an imaging plane, the imaging plane being non-parallel with the utility surface;
    a reflector optically disposed between the utility surface and the optical focusing element, the reflector being configured to redirect rays from the utility surface toward the optical focusing element;
    an imaging surface situated at the imaging plane and encompassed by the enclosure, the imaging surface configured to acquire a representation of the image; and
    a communications interface configured to be encompassed by the enclosure having the door, the communications interface configured to communicate information associated with the representation of the image of the utility panel elements to a receiver outside of the enclosure.

2. The system of claim 1, wherein the rays are infrared light rays.

3. The system of claim 1, wherein the communications interface is at least one of an electrical interface, an optical interface, and a wireless interface.

4. The system of claim 1, wherein
the reflector is attached to the door of the enclosure.

5. The system of claim 1, wherein the focusing element is situated in a focusing element plane, and wherein the utility surface, the focusing element plane, and the imaging surface are oriented in accordance with a Scheimpflug condition.

6. The system of claim 1, wherein the optical focusing element is a Germanium lens.

7. The system of claim 1, wherein the utility surface is at least one of a switch panel, fuse panel, circuit breaker panel, junction box panel, electrical panel, or an electrical interconnect surface.

8. The system of claim 1, wherein the utility surface is substantially planar.

9. The system of claim 1, wherein the optical focusing element comprises two or more elements configured to focus the rays to form the image.

10. A method of imaging utility panel elements arranged on a utility surface encompassed within an enclosure having a door, the method comprising:
    reflecting rays from the utility panel elements to redirect and dispose the rays to be focused;
    focusing, within the enclosure, the rays from the utility panel elements on the utility surface to form an image of the elements at an imaging plane that is non-parallel with the utility surface and encompassed by the enclosure;
    capturing, within the enclosure, the image of the utility panel elements at an imaging surface, the imaging surface coinciding with the imaging plane; and
    transmitting information related to a status of the utility panel elements and based upon the image of the utility panel elements from within an enclosure to outside of the enclosure.

11. The method of claim 10, wherein focusing rays comprises focusing infrared light rays.

12. The method of claim 10, wherein transmitting the information comprises at least one of electrically transmitting, optically transmitting, and wirelessly transmitting.

13. The method of claim 10, wherein
the reflecting is performed at a reflecting surface situated in conjunction with the door to the enclosure.

14. The method of claim 10, further comprising:
    reflecting the rays from the utility panel elements to redirect and dispose the rays to be focused.

15. The method of claim 10, wherein focusing the rays and capturing the image are performed in accordance with a Scheimpflug condition.

16. The method of claim 10, wherein focusing rays from the utility panel elements includes focusing rays from a switch panel, fuse panel, circuit breaker panel, junction box panel, electrical panel, or electrical interconnect.

17. A system for imaging utility panel elements arranged on a utility surface encompassed within an enclosure having a door, the system comprising:
    means for reflecting rays from the utility panel elements to redirect and dispose the rays to be focused;
    means for focusing, within the enclosure, the rays from utility panel elements arranged on a utility surface to form an image of the elements at an imaging plane that is non-parallel with the utility surface and encompassed by the enclosure;
    means for capturing, within the enclosure, the image of the utility panel elements at an imaging surface, the imaging surface coinciding with the imaging plane; and
    means for transmitting information related to a status of the utility panel elements and based upon the image of the utility panel elements from within the enclosure to outside of the enclosure.

18. The system of claim 1, wherein the optical focusing element and the reflector form part of a catadioptric imager.

19. The system of claim 1, wherein the reflector has a conical cross section.

20. The system of claim 1, further including a processor operatively connected to the receiver, the processor configured to determine a temperature or temperature status of the utility panel elements based upon the representation of the image of the utility panel elements.

21. The method of claim 10, wherein reflecting the rays and focusing the rays include using a catadioptric imager.

22. The method of claim 10, wherein reflecting the rays includes using a reflector with a conical cross section.

23. The method of claim 10, further including determining a temperature or temperature status of the utility panel elements based upon the image of the utility panel elements.

* * * * *